United States Patent [19]
Muzik et al.

[11] Patent Number: 5,294,408
[45] Date of Patent: Mar. 15, 1994

[54] COMPACT LIME SLAKER

[75] Inventors: Charles J. Muzik, McKees Rocks; Kenneth L. Yoest, Pittsburgh, both of Pa.

[73] Assignee: Dravo Lime Company, Pittsburgh, Pa.

[21] Appl. No.: 48,736

[22] Filed: Apr. 16, 1993

[51] Int. Cl.$^5$ ............ B01D 43/00; B01F 7/16; B01J 8/08; B07B 1/20
[52] U.S. Cl. ............ 422/162; 209/296; 210/523; 422/203; 422/205; 422/225; 422/232; 422/261; 422/269; 422/281
[58] Field of Search ............ 422/264, 162, 198, 202, 422/203, 205, 225, 227, 232, 233, 261, 269, 276, 281; 209/288, 293, 296; 210/523

[56] References Cited

U.S. PATENT DOCUMENTS

| | | | |
|---|---|---|---|
| 2,611,683 | 9/1952 | Knibbs | 422/162 |
| 2,872,297 | 2/1959 | Dugan | 422/162 |
| 3,194,638 | 7/1965 | Neuville | 422/162 |
| 3,495,946 | 2/1970 | Hudson | 422/269 |
| 3,573,002 | 3/1971 | Zimmerman | 422/162 |
| 4,416,764 | 11/1983 | Gikis et al. | 422/281 |
| 4,436,703 | 3/1984 | Lane | 422/225 |
| 4,588,559 | 5/1986 | Emmett | 422/162 |
| 4,779,992 | 10/1988 | Underwood | 366/137 |

*Primary Examiner*—Robert J. Warden
*Assistant Examiner*—L. M. Crawford
*Attorney, Agent, or Firm*—Armstrong, Westerman, Hattori, McLeland & Naughton

[57] ABSTRACT

A compact lime slaker has an inner vessel forming an initial slaking chamber disposed in an outer vessel forming a final slaking chamber, with agitators provided in both chambers. Slaked lime from the final slaking chamber is pumped to a collection trough where slaked lime and grit are removed therefrom, while a major portion of slaked lime, with grit removed is returned to the final slaking chamber. The slaked lime in the final slaking chamber, at an elevated temperature due to the slaking exotherm, insulates the lime being slaked in the initial slaking chamber and provides heat thereto to aid in the initial slaking. Removal of grit from the portion of slaked lime recycled to the final slaking chamber prevents clogging or attrition of components of the slaker.

11 Claims, 4 Drawing Sheets

COMPACT LIME SLAKER

FIELD OF THE INVENTION

The present invention relates to a slaking apparatus for slaking lime, and a method of slaking, designed to be used for the continuous slaking of relatively small amounts of lime where the slaked lime is used at a relatively low rate.

BACKGROUND OF THE INVENTION

Aqueous slurries of lime, or slaked lime, have many uses where relatively low amounts are required. Such uses include processes for water treatment, removal of contaminants from gaseous streams, and other processing where a continuous supply of slaked lime is required during periods of operation of such processes. Problems exist in the preparation of such slaked lime in that often grit or solids remain after slaking which, unless removed from the slaked lime, can cause clogging of equipment or other problems. For example, where the slaked lime is not continuously removed from a slaking apparatus and grit in a slaked lime is returned to a slaking unit, the grit may accumulate in the slaking unit and cause wear on slaking unit components, clogging of component conduits, and other problems. Also, although the slaking of lime is a exothermic reaction, when relatively small amounts of lime are to be slaked, the exotherm is not sufficient to maintain the desired temperature for slaking and heat must be added to effect a sufficient rate of slaking, which addition of heat is a cost factor that must be accommodated. Thus, due to the problem of heat of reaction, grit buildup, and other factors, the adequate slaking of relatively low amounts of lime has been a constant problem.

It is an object of the present invention to provide a lime slaking apparatus which can be used to continuously slake lime at a relatively low rate, for example, a rate of about 50 to 750 pounds per hour or less, with removal of grit from the slaked lime prior to return of slaked lime, for additional slaking, to the slaking vessel, which reduces wear on the slaker components, clogging and other problems associated with conventional slakers.

It is another object of the present invention to provide a lime slaking apparatus which can be used to continuously slake lime where the heat of an initially slaked supply of lime is used to provide heat to fresh lime slurry being slaked.

It is a further object of the present invention to provide for three different stages of mixing and slaking of lime by use of an inner slaking chamber, outer slaking chamber and recirculating pump device so as to provide improved slaking of lime in water.

SUMMARY OF THE INVENTION

The compact lime slaker of the present invention includes inner and outer slaking chambers, with slaked lime in the outer chamber insulating the slaked lime in the inner chamber. The lime slaking apparatus includes an outer vessel that has a bottom wall and an upwardly extending side wall that is preferably cylindrical in shape and forms an outer or final slaking chamber. An inner vessel also has a bottom wall and an upstanding, preferably cylindrical, sidewall which forms an inner or initial slaking chamber. The inner vessel is disposed in the outer vessel with the bottom and sidewall of the inner vessel spaced from the bottom and sidewall of the outer vessel. Spacers hold the two vessels in the desired relationship. The bottom wall of the inner vessel has a shaft bore therethrough, and a discharge opening is provided in a wall of the inner vessel so that the initial slaking chamber communicates with the final slaking chamber.

A rotatable shaft passes through the shaft bore in the bottom wall of the inner vessel and a motor is provided to rotate the shaft which carries agitators thereon in both the initial and final slaking chambers. A lime charging device and water charging device are provided to charge lime and water to the initial slaking chamber. A collection trough communicates with the final slaking chamber and a pump is provided to discharge slaked lime from the final slaking chamber to the collection trough. A return conduit returns a portion of the slaked lime from the collection trough back to the final slaking chamber, while a discharge conduit carries slaked lime product from the collection trough for use.

In the collection trough, a solids removal device, such as a screw conveyor, removes grit from the slaked lime fed to the collection trough and discharges the grit from the slaking apparatus along with the slaked lime product so as to prevent return of, and accumulation of, grit in the slaking vessel.

In accordance with the present method, lime and water are charged to an initial slaking chamber and agitated to slake the lime with a resulting exotherm. The slaked lime is passed from the initial slaking chamber to a final slaking chamber that surrounds the initial slaking chamber, so that hot slaked lime insulates the contents of the initial slaking chamber, with the slaked lime further agitated in the final slaking chamber.

Slaked lime is discharged from the final slaking chamber to a collection trough from which a major portion for the slaked lime is returned to the final slaking chamber while slaked lime product is discharged for use. Preferably, grit is separated from the major portion of the lime that is returned to the final slaking chamber, which grit is discharged from the collection trough along with the slaked lime product and separated therefrom prior to use.

BRIEF DESCRIPTION OF THE DRAWINGS

The present invention will be more readily understood by reference to the embodiment shown in the drawings, wherein.

DETAILED DESCRIPTION

Figure 1:
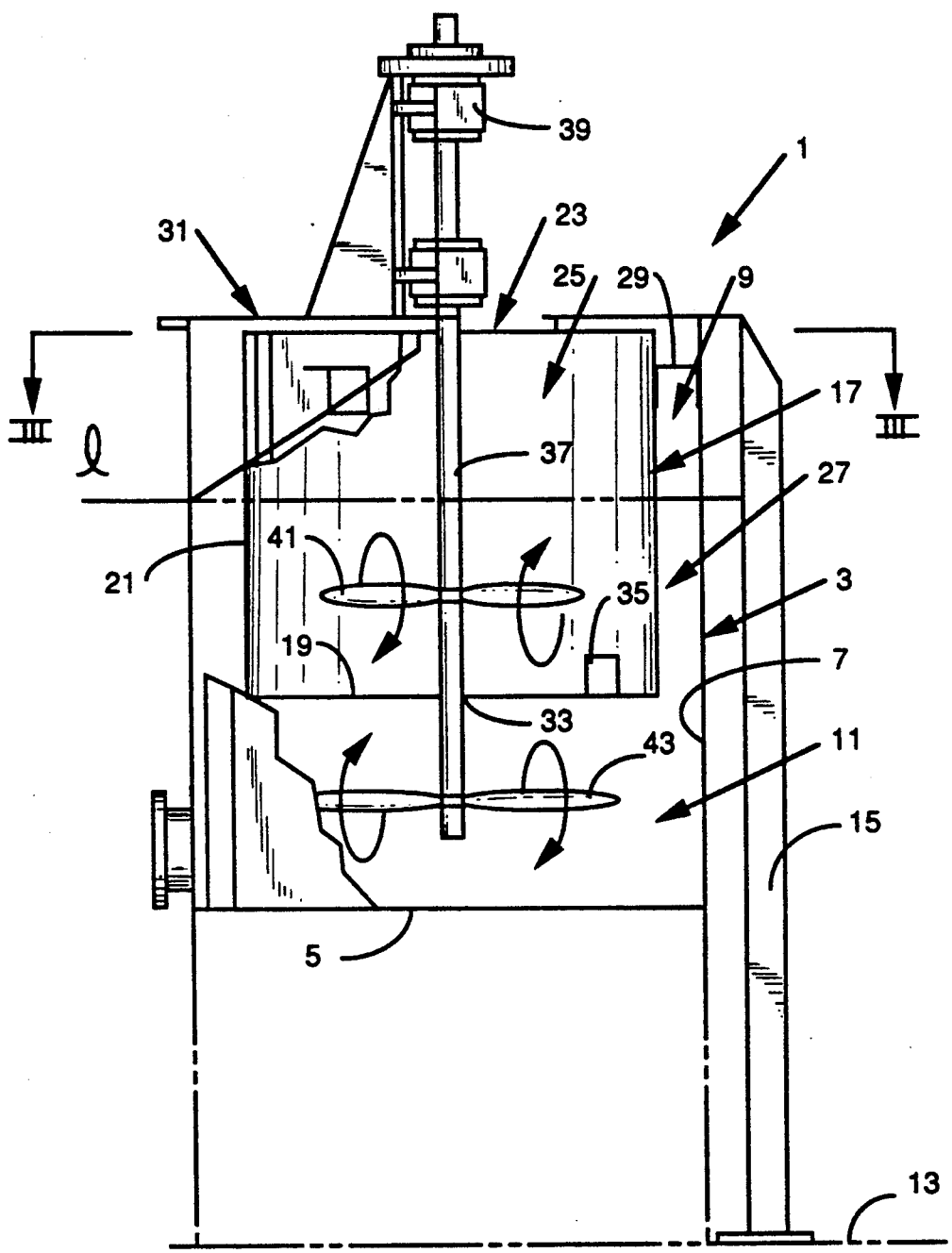
FIG. 1 is a side elevational view, with portions cut away, of inner and outer vessels for the slaking of lime and water.

The present invention provides a compact lime slaking apparatus and a method of slaking lime in relatively small quantities and on a continuous basis. The apparatus and method provide for an improved continuous slaking of lime in water at a predetermined rate and without buildup in the slaking vessel of grit associated with such lime slaking.

Referring now to the drawings, the compact lime slaking apparatus 1 of the present invention is illustrated having an outer vessel 3 with a bottom wall 5 and an upwardly extending side wall 7 that is preferably cylindrical or tubular in shape. The outer vessel 3 has an open top 9, and forms a final slaking chamber 11. The outer vessel 3 is supported on a work surface 13 by means of legs 15 secured to the outer surface of side wall 7. Disposed within the outer vessel 3 is an inner vessel 17 which has a bottom wall 19, an upwardly extending tubular side wall 21 and an open top 23 which forms an initial slaking chamber 25. The inner vessel 17, as illustrated, is disposed within the outer vessel 3 so as to form an annular gap 27 between the side wall 7 of the outer vessel 3 and the side wall 21 of the inner vessel 17, and with the bottom wall 19 of the inner vessel 17 spaced from the bottom wall 5 of the outer vessel 3. Hangers or spacers 29 may be provided, affixed to the side walls 7 and 21 to stabilize the location of the inner vessel 17 within the outer vessel 3. A cover 31 is preferably provided to close the open tops 9 and 23 of the inner and outer vessels 3 and 17.

The bottom wall 19 of inner vessel 17 has a shaft bore 33 formed therethrough and a discharge opening 35 is formed in a wall of inner vessel 17, such as illustrated through side wall 21 adjacent bottom wall 19, which enables communication between the initial slaking chamber 25 and final slaking chamber 11. A rotatable shaft 37 extends from above inner vessel 17 and through shaft bore 33 in bottom wall 19 thereof, terminating adjacent the bottom wall 5 of outer vessel 3, and a motor 39 is provided for rotating the shaft 37. Agitators or impellers 41 are provided on rotatable shaft 37 in initial slaking chamber 25, while additional agitators or impellers 43 are also provided on the rotatable shaft 37 in final slaking chamber 11. The impellers 41 and 43 are designed to give primarily vertical circulatory motion to liquid medium in the initial and final slaking chambers 25 and 11, respectively. A liquid feed inlet 45 and a solids feed inlet 47 are provided in cover 31 for charging water and lime to the initial slaking chamber 25.

Figure 4:
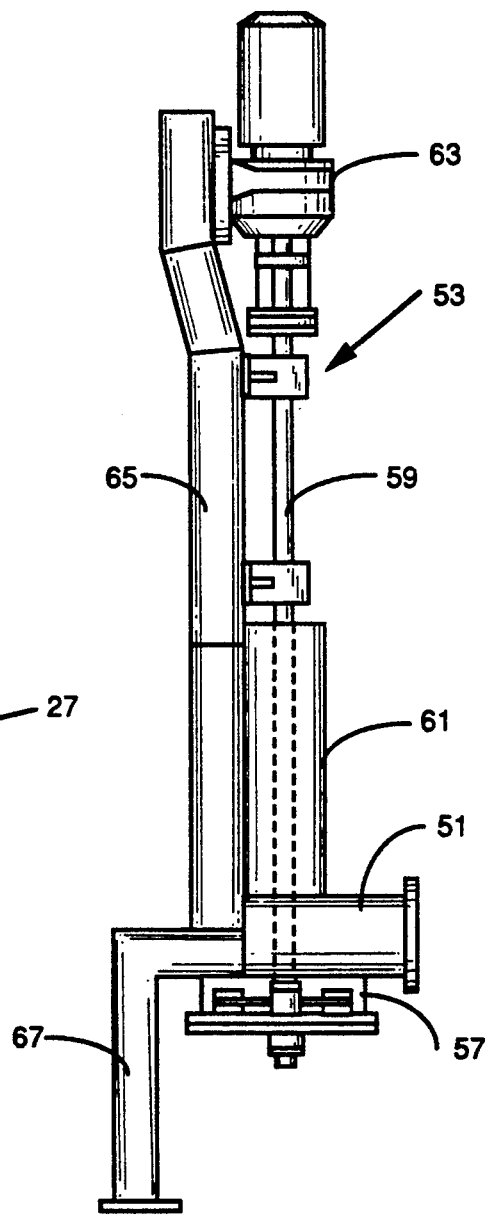
FIG. 4 is a side elevational view of the pump used to discharge slaked lime from the outer vessel.

A final slurry flow passageway 49, in side wall 7 of outer vessel 3, leads to an outlet conduit 51 adjacent the bottom wall 5, to a pump 53 (FIGS. 4 & 5) which circulates final slurry from the outlet conduit 51 to a collection trough 55. The pump 53 is preferably a non-clogging, open impeller, centrifugal pump formed from an abrasion resistant steel and designed to pass the largest insoluble solid particle fed to the initial slaking chamber 25. The pump 53 includes an impeller 57 and a shaft 59 disposed within a column 61 and has a motor 63 with the capacity to lift slurry from adjacent the bottom 5 of the outer vessel 3 to the collection trough 55, when the system is being filled or emptied, through outlet conduit 51. The pump 53 may be supported by support brace 65 and leg 67. When in normal operation, the pump 53 maintains a steady flow from the final slaking chamber 11 through flow passageway 49 to the collection trough 55 at a relative zero head. Pump 53 should have a capacity greater than the expected output of outer slaking vessel 3.

Figure 2:
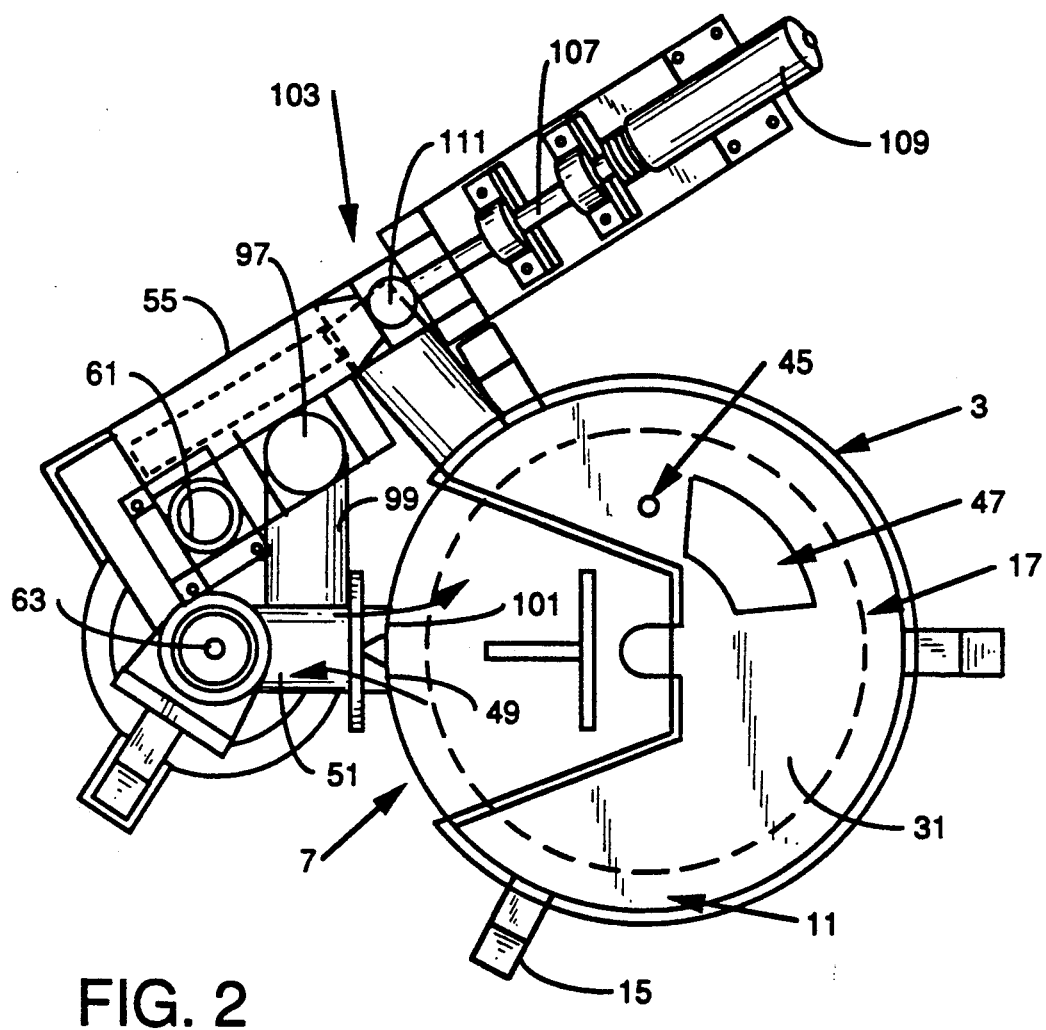
FIG. 2 is a top plan view of the compact slaking apparatus of the present invention.
Figure 3:
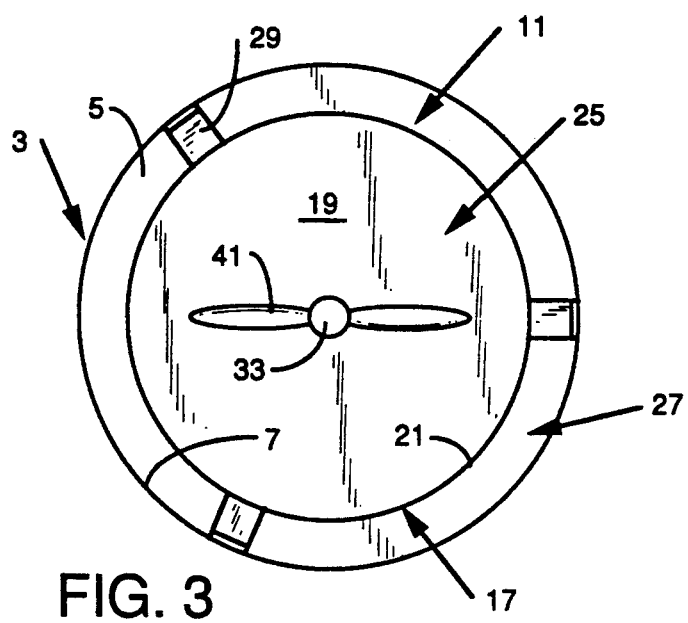
FIG. 3 is a horizontal cross-sectional view, taken along line III—III of FIG. 1, through the vessels of FIG. 1.
Figure 5:
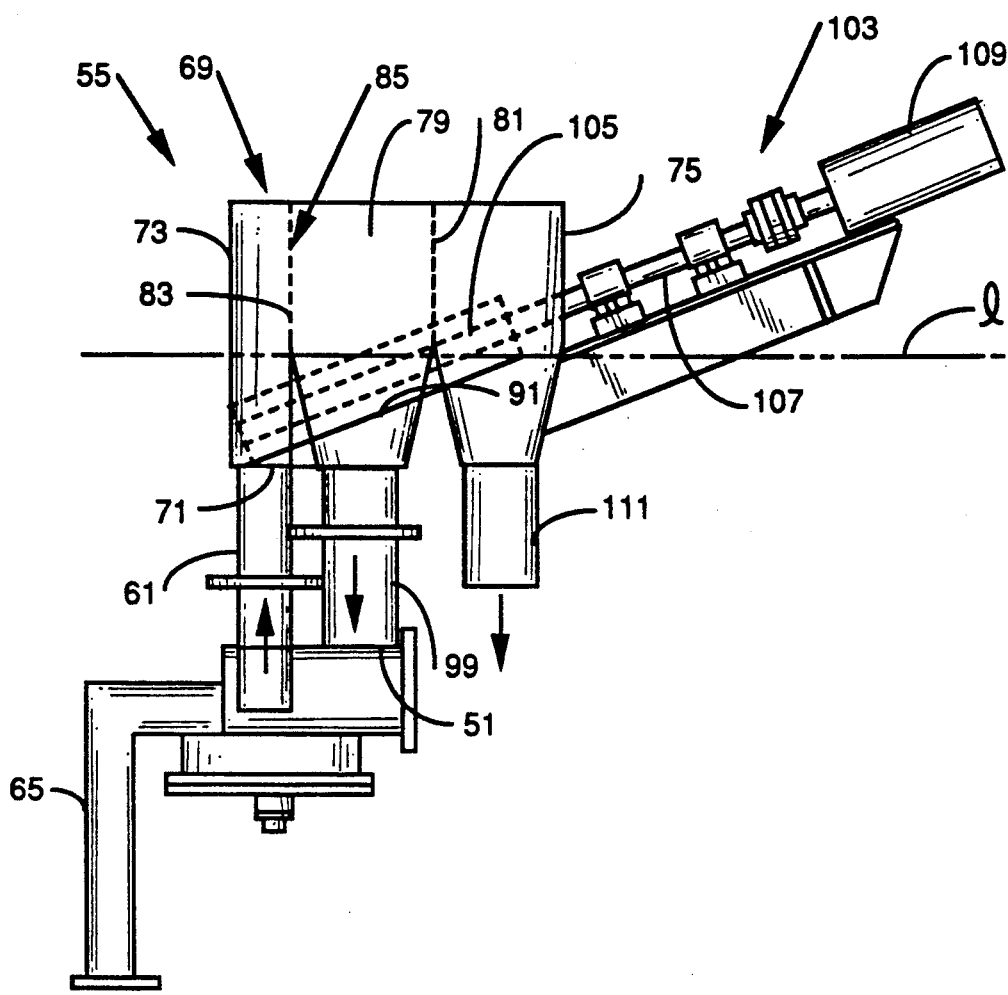
FIG. 5 is a side elevational view of the collection trough, and grit removal device preferably used in the compact lime slaker of the present invention.
Figure 6:
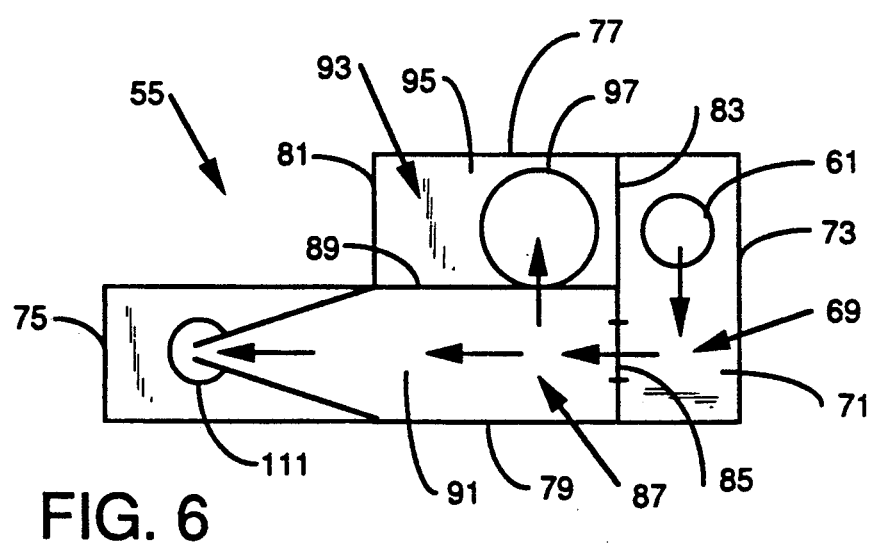
FIG. 6 is a diagrammatical top-plan view of the collection trough shown in FIG. 5 with the grit removal device removed for clarity.

The collection trough 55 is compartmentalized and is adapted to accept lime slurry from the outer vessel 3, remove grit from the slurry, return a major portion of slurry with grit removed back to the outer vessel 3, and discharge a lime slurry product which contains the grit from the slaking apparatus. Referring now to FIGS. 5 and 6, the collection trough 55 has an inlet compartment 69 into the bottom 71 of which lime slurry from final slaking chamber 11 is fed through column 61 by pump 53. Collection trough 55 has end walls 73 and 75 and connecting walls 77 and 79, connecting wall 77 having a stepped portion 81. A compartmental wall 83 extends between connecting walls 77 and 79, and with end wall 73 forms inlet compartment 69. An opening 85 is formed in compartmental wall 83 to permit discharge of slaked lime from inlet compartment 69 to a settling and separation compartment 87. The settling and separation compartment 87 is composed of end wall 75 and compartmental wall 85, connecting wall 79 and an overflow wall 89 and preferably has a concave bottom wall 91. Lime slurry containing grit that is discharged from the inlet compartment 69 through opening 85 is directed downwardly into the settling and separation compartment 87. Grit will tend to sink to the bottom of settling and separation compartment 87 along the concave bottom wall 91, while lime slurry with at least a portion of the grit removed will overflow the overflow wall 89 into a return compartment 93 formed by connecting wall 77, compartmental wall 83, stepped wall 81 and overflow wall 89 and a bottom wall 95, which bottom wall 95 has a discharge 97 therein that leads to a return conduit 99, the return conduit 99 communicating with the final slaking chamber 11 and returning slaked lime back to the final slaking chamber. As shown in FIG. 2, the return conduit 99 preferably returns slaked lime to the final slaking chamber 11, immediately adjacent the flow passageway 49, through a return passageway 101. The slaked lime that is returned to the final slaking chamber 11 has had the grit removed therefrom such that less wear on components of the outer vessel 3 and agitator 43 will result and clogging of the outlet conduit 51 and pump 53 prevented.

Slaked lime product and grit are moved in the settling and separation compartment 87, preferably by the use of a screw conveyor 103 having a screw member 105 carried on a shaft 107 and operable by a motor 109. The slaked lime product and grit are directed by the screw conveyor 103 to a product discharge conduit 111 and removed from the slaking apparatus 1. The grit is then removed, as is conventional, by passage through a screen or other solids removal device (not shown), and the slaked lime used for the purpose for which it was produced.

The present method enables the slaking of lime in relatively small quantities for use, such as continuous slaking of lime in amounts between about 50 to 750 pounds per hour, in an efficient and economical manner. In start-up, water is initially fed to the apparatus 1 with the pump motor 63 operating until both the initial and final slaking chambers 25 and 11 are filled to a level which corresponds to the level of water in the collection trough 55. Water charging is stopped and lime is then introduced to the initial slaking chamber 25 formed by the inner vessel 17 through the lime charging device, which lime may be in the form of quicklime or hydrated lime. At this point in the operation, the level 1 of the slurry in the inner and outer vessels 17 and 3 and the collection trough 55 is such that further feeding of lime to the apparatus 1 will cause some slaked lime product to be discharged through the lime product discharge conduit ill while a major portion, generally up to about 90 percent, of the slaked lime will be returned to the final slaking chamber 11. The lime slurry product will thus be discharged from the apparatus 1 at a rate that is controlled by the rate of feed of lime and water to the initial slaking chamber 25. Thus, once the slaking has been initiated at the desired rate, the continuous discharge of slaked lime from the apparatus 1 will be controlled by the rate of addition of fresh lime and water to the apparatus.

The agitators 41 and 43 in both inner and outer vessels 17 and 3 agitate through the contents of the initial and final slaking chambers to circulate the same in a predominantly vertical circulation pattern with a force sufficient to prevent a buildup of solid material on the sides and bottom of either chamber. Slaked lime agitated in the initial slaking chamber 25 passes from the initial slaking chamber 25 through the discharge opening 35 into the final slaking chamber 11 where it is further agitated prior to being withdrawn by the pump 53 to the collection trough 55. Lime slurry that is not discharged through the product discharge conduit 111 is returned to the final slaking chamber 11. In the collection trough 35, grit is removed from the slurry and discharged with the product lime slurry and subsequently separated therefrom.

With the present method and apparatus, three areas of mixing of the solid lime and water are provided to enhance the degree of slaking, with the mixing first effected by agitator 41 in the initial slaking chamber 25, then by agitator 43 in the final slaking chamber 11, and also during passage through the pump 53.

The present method thus provides f or the slaking of lime at a relatively low rate under continuous conditions. Generally, slaked lime will contain about 25 to 30 percent solids, although the actual solids content will be determined by the end use of the slaked lime.

What is claimed is:

1. A lime slaking apparatus comprising:
   an outer vessel having a bottom wall, upwardly extending tubular side wall and an open top forming a final slaking chamber;
   an inner vessel having a bottom wall, upwardly extending tubular side wall and an open top forming an initial slaking chamber, said inner vessel disposed within said outer vessel with an annular gap between the sidewalls of said inner vessel and said outer vessel and with said bottom walls in spaced relationship;
   said inner vessel having a shaft bore through the bottom wall thereof, and a discharge opening in a wall thereof such that said initial slaking chamber of said inner vessel communicates with said final slaking chamber of said outer vessel;
   a source of lime and water, and means disposed at the top of said inner vessel for charging said lime and water into said initial slaking chamber;
   a rotatable shaft extending from above said inner vessel and through said shaft bore into said outer vessel, and terminating adjacent said bottom wall of said outer vessel, said shaft having agitators thereon in both said initial and final slaking chambers;
   means for rotating said shaft;
   a collection trough for slaked lime;
   means for discharging slaked lime from said outer vessel to said collection trough;
   means for recycling at least a portion of discharged slaked lime from said collection trough back to said final slaking chamber; and
   means for discharging a slaked lime product from said collection trough.

2. The lime slaking apparatus as defined in claim 1 including means for removing solids in said collection trough for removing solids from said slurry and discharging the same with said slaked lime product from said collection trough.

3. The lime slaking apparatus as defined in claim 1 wherein said agitators comprise impellers which, upon rotation of said shaft, give primarily vertical circulatory motion to liquid medium contained in said initial and final slaking chambers.

4. The lime slaking apparatus as defined in claim 1 wherein said discharge opening is provided in said upwardly extending tubular side wall of said inner vessel adjacent said bottom wall thereof.

5. The lime slaking apparatus as defined in claim 1 wherein said means for discharging slaked lime product from said collection trough includes a concave bottom wall on said collection trough and a screw conveyor operable to direct grit and slaked lime to a discharge conduit.

6. The lime slaking apparatus as defined in claim 1 wherein said collection trough comprises two end walls, two connecting walls, and a plurality of compartmental walls arranged within the collection trough to provide an inlet compartment, a settling and separation compartment, and a return compartment.

7. The lime slaking apparatus as defined in claim 1 including means for returning said recycled portion of discharged lime to said final slaking chamber adjacent said means for discharging slaked lime from said outer vessel to said collection trough.

8. A lime slaking apparatus comprising:
   an outer vessel having a bottom wall, upwardly extending, tubular side wall and an open top forming a final slaking chamber;
   an inner vessel having a bottom wall, upwardly extending tubular side wall and an open top forming an initial slaking chamber, said inner vessel disposed within said outer vessel with an annular gap between the sidewalls of said inner vessel and said outer vessel and with said bottom walls in spaced relationship;
   said inner vessel having a shaft bore through the bottom wall thereof, and a discharge opening in said upwardly extending side wall thereof, adjacent said bottom wall, such that said initial slaking chamber of said inner vessel communicates with said final slaking chamber of said outer vessel;
   a source of lime and water, and means disposed at the top of said inner vessel for charging said lime and water into said initial slaking chamber;
   a rotatable shaft extending from above said inner vessel and through said shaft bore into said outer vessel, and terminating adjacent said bottom wall of said outer vessel, said shaft having agitators thereon which, upon rotation of said shaft, give primarily vertical circulatory motion to the liquid medium contained in both said initial and final slaking chambers;
   means for rotating said shaft;
   a collection trough for slaked lime;
   means for discharging slaked lime from said outer vessel to said collection trough;

means for recycling at least a portion of discharged slaked lime from said collection trough back to said final slaking chamber; and means for discharging a slaked lime product from said collection trough.

9. The lime slaking apparatus as defined in claim 8 including means for removing solids in said collection trough for removing solids from said slurry and discharging the same with said slaked lime product from said collection trough.

10. The lime slaking apparatus as defined in claim 9 wherein said means for discharging slaked lime product from said collection trough includes a concave bottom wall on said collection trough and a screw conveyor operable to direct grit and slaked lime to a discharge conduit.

11. The lime slaking apparatus as defined in claim 8 including means for returning said recycled portion of discharged lime to said final slaking chamber adjacent said means for discharging slaked lime from said outer vessel to said collection trough.

* * * * *